United States Patent [19]

Leubecker

[11] Patent Number: 4,528,468
[45] Date of Patent: Jul. 9, 1985

[54] DIGITAL LINEAR ACTUATOR

[76] Inventor: Charles W. Leubecker, P.O. Box 34, Fawn Grove, Pa. 17321

[21] Appl. No.: 565,644

[22] Filed: Dec. 27, 1983

[51] Int. Cl.³ .................................................. H02K 33/00
[52] U.S. Cl. ........................................ 310/21; 310/22; 310/80; 310/83
[58] Field of Search .................. 310/21, 22, 80, 83, 310/20, 25, 32, 33

[56] References Cited

U.S. PATENT DOCUMENTS

| | | | |
|---|---|---|---|
| 599,913 | 3/1898 | McNerney | 310/22 |
| 1,724,825 | 8/1929 | Chirol | 310/22 |
| 2,281,262 | 4/1942 | Breitenstein | 74/142 |
| 2,785,323 | 3/1957 | Fuchs | 310/22 |
| 2,978,621 | 4/1961 | Martinek | 310/83 X |
| 3,010,055 | 11/1961 | Nicolaus | 317/191 |
| 3,115,589 | 12/1963 | Bender et al. | 310/21 |
| 3,121,812 | 2/1964 | MacArthur | 310/20 X |
| 3,242,746 | 3/1966 | Seiden | 74/142 |
| 3,278,774 | 10/1966 | Roller et al. | 310/80 X |
| 3,303,709 | 2/1967 | Slisz et al. | 74/142 |
| 3,398,303 | 8/1968 | Koch | 310/22 |
| 4,179,944 | 12/1979 | Conner | 74/89.15 |

Primary Examiner—Donovan F. Duggan
Attorney, Agent, or Firm—Charles J. Long

[57] ABSTRACT

A digital linear actuator capable of converting pulsed electrical current into positive and precise increments of linear motion. The actuator includes a threaded shaft which is prevented from rotating, a cylindrical rotor threaded on the shaft, and drive means spaced from the rotor and operative in response to a pulse of electric current to engage the rotor and turn the rotor through a predetermined arc, thereby causing linear motion by either the rotor or the shaft in the direction of the longitudinal axis of the shaft. Preferably the rotor circumference is toothed, and the drive means include an electromagnet which, when energized by a pulse of current, causes movement of a pivoted finger; when the finger moves, a flexible reed attached at one end thereof engages one of the rotor teeth and causes rotation of the rotor.

5 Claims, 2 Drawing Figures

DIGITAL LINEAR ACTUATOR

BRIEF SUMMARY OF THE INVENTION

This invention relates to electro-mechanical actuators. More particularly, it relates to such actuators which cause an increment of linear movement in response to a pulse of electric current.

In many situations it is necessary or desirable to cause precise linear motion of a member in response to the digital or pulsing output of a computer or in response to manually caused electrical pulses. Heretofore, the most common method to achieve such motion in light duty applications such as computer printers (for moving the print head back and forth) has utilized a stepping motor, at least two cog pulleys and a cog belt. The stepping motor requires a system of energizing and de-energizing typically four separate coil circuits in a predetermined sequence to cause one increment of linear motion at a time. To effect such a sequence, a complex electronic circuit is required to interface the motor to the controller or computer.

I have invented an improved actuator for converting the pulsed electrical output of a digital computer or the like to increments of linear motion; my actuator requires only one coil circuit and no complex interfacing circuit, and in one embodiment the linear motion can be reversed by simply reversing the polarity of the electrical input to the coil circuit.

In accordance with the invention, I provide a digital linear actuator comprising an externally threaded shaft, means preventing the shaft from rotating, an internally threaded generally cylindrical rotor threaded on the shaft, and drive means spaced from the rotor and operative in response to a pulse of electric current to engage the rotor and turn the rotor through a predetermined arc, whereby the shaft undergoes an increment of linear translation relative to the rotor. Preferably a frame supports the shaft for linear motion.

In a preferred embodiment the frame includes a base and two parallel arms extending from opposite sides of the base, the shaft is supported by the arms, and the rotor is positioned between and closely spaced from the arms, whereby the frame and rotor act substantially as a unit with respect to linear movement by the shaft.

I prefer that adjacent equally sized teeth, each running parallel to the shaft, are formed around the circumference of the rotor, and the drive means engage the toothed circumference and thereby cause incremental rotation of the rotor.

Preferably, the drive means of an actuator according to my invention comprises an electromagnet mounted on the frame; a finger having a first end pivoted at the base of the frame and extending past the electromagnet to a free end near the rotor, at least a portion of the finger being magnetic, the finger being so constructed and arranged that when the electromagnet is energized the finger is magnetically attracted from a first position spaced from the electromagnet to a second position adjacent to the electromagnet; means for maintaining the finger in the first position when the electromagnet is not energized; and a reed attached at the free end of the finger and extending toward the rotor, the reed being so positioned that when the finger moves from the first to the second position the end of the reed engages a tooth in the rotor circumference and causes the rotor to turn through the predetermined arc.

In order to provide potential for reverse motion, I prefer that the electromagnet comprise a polar wound coil having a generally rod-shaped core through its center, whereby application of direct current through the coil causes the ends of the core to be magnetically oppositely polarized from one another.

In my preferred embodiment, the electromagnet is positioned on the frame with its core transverse to the shaft, the finger extends past one end of the core, and a permanent magnet is so mounted on the finger that when the finger is in the second position the polar axis of the permanent magnet is aligned with the axis of the core.

In an especially preferred embodiment in which reversal of linear motion is possible by merely reversing polarity of the input to the coil, I provide a digital linear actuator comprising an externally threaded shaft; a frame supporting the shaft for linear motion, the frame comprising a base and two parallel arms extending from opposite sides of the base, the shaft being supported by the arms; means preventing the shaft from rotating; an internally threaded generally cylindrical rotor threaded on the shaft and positioned between and closely spaced from the arms of the frame, the outer surface of the rotor being formed of adjacent equally sized teeth running parallel to the shaft; an electromagnet comprising a polar wound coil and a generally rod-shaped core through the coil, the electromagnet being mounted on the base of the frame with the core transverse to the shaft; first and second fingers at opposite ends of the core, each finger having a first end pivoted at the base of the frame and extending past an end of the core to a free end near the rotor; means limiting pivotal movement of each finger to movement between a first position spaced from the core and a second position adjacent to the core; first and second reeds attached respectively at the free ends of the first and second fingers and extending toward the rotor, the reeds being so constructed and arranged that when the first finger moves from the first to the second position the end of the first reed engages a tooth in the rotor surface and causes the rotor to turn through a predetermined arc in a first direction to thereby cause an increment of forward linear motion of the shaft, and when the second finger moves from the first to the second position the end of the second reed engages a tooth in the rotor surface and causes the rotor to turn in the direction opposite the first direction to thereby cause an increment of reverse linear motion of the shaft; first and second permanent magnets mounted respectively on the first and second fingers, each magnet having a north pole and a south pole defining a polar axis, the magnets being so positioned and oriented that when a finger is in its second position the polar axis of the magnet mounted thereon is aligned with the axis of the core, the polarity of both magnets being the same with respect to the core, whereby application of direct current in one direction through the electromagnet coil causes magnetic attraction of the first finger from the first position to the second position and repulsion of the second finger and application of direct current in the opposite direction through the coil causes magnetic attraction of the second finger from the first position to the second position and repulsion of the first finger; and means for returning each finger to its first position when the electromagnet is not energized.

BRIEF DESCRIPTION OF THE DRAWINGS

In the accompanying drawings I have shown a certain present preferred embodiment of the invention in which.

DESCRIPTION OF THE PREFERRED EMBODIMENT

Figure 1:
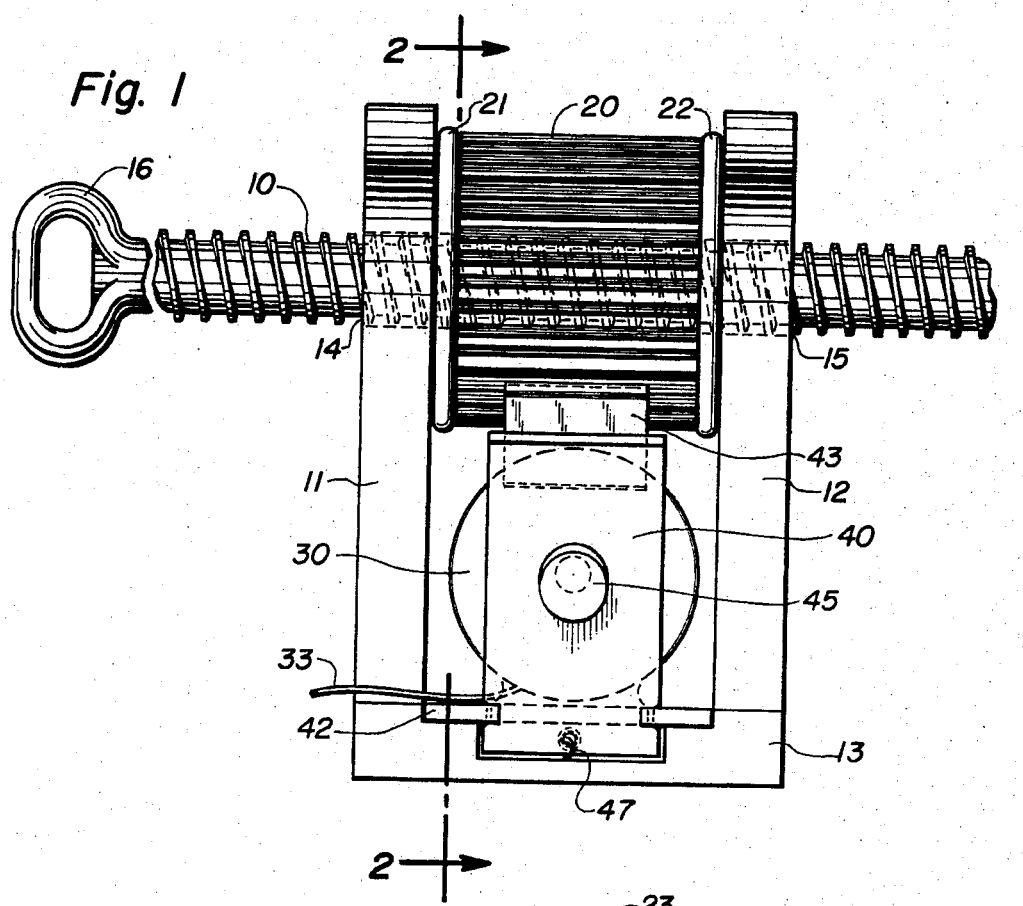
FIG. 1 is a side view of a digital linear actuator according to the invention.
Figure 2:
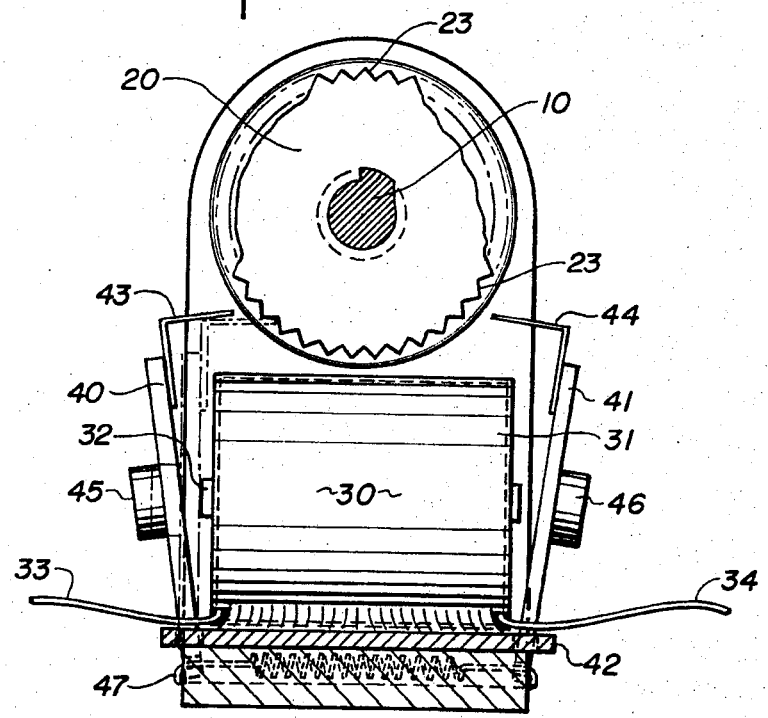
FIG. 2 is a view taken along the line 2—2 of FIG. 1.

FIGS. 1 and 2, in which like parts are designated by like numerals, show a reversible actuator suitable for converting DC input to precisely controlled linear motion.

In the embodiment shown, an externally threaded shaft 10 is supported for linear motion by two parallel arms 11 and 12 extending from opposite sides of a base 13. The bores 14 and 15 through which the shaft passes are preferably hardened in known ways to resist wear from the sliding shaft.

During use, an eye 16 fixed to the end of shaft 10 may be held in position by a pin (not shown) which is part of a member (not shown) to be moved by the actuator; the pin and eye serve as means preventing the shaft from rotation, although it will be understood that other means, such as a key on one of the arms 11 or 12 coacting with a longitudinal keyway cut into the shaft, could serve equally well to accomplish the same end. It will be understood that the shaft must be kept from turning so that rotation of the rotor will cause linear motion rather than merely causing the shaft to turn about its longitudinal axis.

A generally cylindrical rotor 20, internally threaded to match the shaft threads, is positioned between the arms 11 and 12 and threaded onto the shaft 10; dimensions are selected so that the ends of the rotor are closely spaced from the arms. Thrust washers 21 and 22 are positioned between the rotor and the arms to provide slight resistance to turning of the rotor, for reasons which will be discussed hereinbelow.

As is evident from the drawing figures, turning the rotor causes relative linear motion of the shaft to the left or right viewing FIG. 1; if the base 13 is fixed the shaft will move and if the shaft is fixed the base-rotor unit will move.

The exterior surface of the rotor 20 is formed from adjacent equally sized teeth 23 running parallel to the shaft; for clarity and illustration only a portion of the teeth are shown in FIG. 2. Preferably, each tooth has flat faces which meet to form an included angle of about 90 degrees. An electromagnet 30 consisting of a coil 31 and a rod-shaped core 32 is fastened to the base 13. The coil, which may be formed from copper wire, is polar wound, i.e. the wire is wound in only one direction from one end to the other; thus, direct current applied to the coil leads 33 and 34 magnetically polarizes the core 32, giving one end north and the other end south polarity. The electromagnet is mounted so that the axis of the core 32 is transverse to the axis of rotation of the rotor 20.

Mounted on either side of base 13 are two fingers, 40 and 41, each pivoted near one end by interlocking with a pivot plate 42; the fingers extend past the electromagnet 30 to free ends near the rotor 20. The pivot plate 42 limits each finger to movement between a first position spaced from the electromagnet, shown in solid lines in FIG. 2, and a second position adjacent the electromagnet, shown in broken lines in FIG. 2 for finger 40. It will be seen that the pivot plate is so designed that in the second position each finger is flush with its corresponding end of the core 32.

At the free ends of fingers 40 and 41 are attached reeds 43 and 44 respectively. In the embodiment shown, the reeds may be fabricated from thin spring steel and may be brazed or soldered onto the fingers. The reeds are right angle pieces and the length of legs of each reed are selected so that when the finger to which it is attached moves from the first to the second position, the end of the reed engages one of the teeth in rotor 20 and thereby causes rotation of the rotor through a predetermined arc. The use of thin spring steel for the reeds insures that the reeds will deflect easily if they contact the teeth of the rotor when the fingers pivot from their second to their first positions; such deflection can be illustrated by visualizing the path taken by the end of reed 43 in FIG. 2, and it should be noted that the thrust washers 21 and 22 prevent unwanted reverse rotation of the rotor when such contact occurs.

The size of the predetermined arc through which each finger moves the rotor (and accordingly the length of each increment of linear motion caused thereby) is determined by the length of the reed and the distance between the finger's first and second positions. Since the second position is fixed by the end of the electromagnet core 32, adjustment of the predetermined arc size is for practical purposes a matter of adjusting the first position of the fingers and then selecting a reed length sufficient to bring about the necessary interaction between reed and rotor tooth.

In order to strengthen the magnetic forces between the fingers and electromagnet I prefer to mount permanent magnets 45 and 46 of the rare earth cobalt type to the fingers. It will be understood that each such magnet has north and south poles which define a polar axis. The orientation and position of the permanent magnets 45 and 46 are such that (a) the polar axis of each is aligned with the electromagnet's core axis when the corresponding finger is in its second position, and (b) the same pole on each magnet is facing the core 32. With magnets 45 and 46 thus oriented, DC energizing of electromagnet 30 will attract the finger on the side where the core end polarity is opposite that of the facing permanent magnet and repel the other finger, where the two polarities are alike. Also with such orientation, reversal of the direct current through the electromagnet coil will attract the formerly repelled finger and repel the formerly attracted finger, thereby reversing the rotation of rotor 20 and the resulting linear motion of shaft 10.

The portions of fingers 40 and 41 extending below the pivot plate 42 are joined in the embodiment shown by a spring 47 having sufficient strength to overcome the magnetic attraction of permanent magnets 45 and 46 for the ends of core 32 when the electromagnet 30 is not energized; the spring 47 thus serves as a means to return both fingers to their first positions when the electromagnet 30 is not energized. Other such return means could of course be used.

In assembling an actuator according to the invention, the size and magnetic characteristics of the electromagnet and permanent magnets are selected so that when the direct current available in the particular application is fed through coil 31 there will be sufficient magnetic attraction forces generated to (a) overcome the resistance of spring 47, (b) pull the appropriate finger from its first to second position and (c) in the process turn rotor 20 through the predetermined arc.

Unless another material is indicated as being preferred, the various elements of my actuator may be fabricated from carbon steel; however, selection of suitable materials is well within the skill of the art and takes into account the application and environment in which the actuator is to be used.

Use of the actuator of my invention proceeds as follows: Depending on the specific application, either the base-rotor unit can be fixed in place so that the shaft will move, or the shaft can be fixed and the base-rotor unit allowed to move. Leads 33 and 34 of the electromagnet 30 are connected to a source of pulsed electric current, preferably direct current; such pulses may be generated by output from a computer, for example, or they may be generated simply by the user's closing a switch. As has previously been explained, each pulse of current in one direction through the electromagnet causes the shaft to undergo an increment of linear motion in one direction with respect to the base; reversing the direction of current flow causes a reversal of the direction of linear motion.

Actuators according to my invention have many areas in which they are potentially useful. Among these, of course, are computer applications. However, another area is that of hydraulic cylinder replacement; in some light duty applications, my actuator can be used in place of a hydraulic cylinder, providing more precise control than the cylinder while eliminating the inconvenience of possible fluid leaks, etc.

While I have shown and described a certain present preferred embodiment of the invention, it is to be distinctly and understood that the invention is not limited thereto, but may be otherwise variously embodied within the scope of the following claims.

I claim:

1. A digital linear actuator comprising
   an externally threaded shaft;
   a frame supporting the shaft for linear motion, the frame comprising a base and two parallel arms extending from opposite sides of the base, the shaft being supported by the arms;
   means preventing the shaft from rotating;
   an internally threaded generally cylindrical rotor threaded on the shaft and positioned between and closely spaced from the arms, whereby the frame and rotor act substantially as a unit with respect to linear movement by the shaft, the circumference of the rotor having adjacent equaly sized teeth formed therearound, each tooth running parallel to the shaft; and
   drive means spaced from the rotor and operative in response to a pulse of electric current to engage the toothed circumference of the rotor and turn the rotor through a predetermined arc, whereby the shaft undergoes an increment of linear translation relative to the rotor.

2. An actuator as claimed in claim 1, in which the drive means comprise
   an electromagnet mounted on the frame;
   a finger having a first end pivoted at the base of the frame and extending past the electromagnet to a free end near the rotor, at least a portion of the finger being magnetic. the finger being so constructed and arranged that when the electromagnet is energized the finger is magnetically attracted from a first position spaced from the electromagnet to a second position adjacent to the electromagnet;
   means for maintaining the finger in the first position when the electromagnet is not energized; and
   a reed attached at the free end of the finger and extending toward the rotor, the reed being so constructed and arranged that when the finger moves from the first to the second position the end of the reed engages a tooth in the rotor circumference and causes the rotor to turn through the predetermined arc.

3. An actuator as claimed in claim 2, in which the electromagnet comprises a polar wound coil having a generally rod-shaped core through its center, whereby application of direct current through the coil causes the ends of the core to be magnetically oppositely polarized from one another.

4. An actuator as claimed in claim 3, in which the electromagnet is positioned on the frame with its core transverse to the shaft, the finger extends past one end of the core, and a permanent magnet is so mounted on the finger that when the finger is in the second position the polar axis of the permanent magnet is aligned with the axis of the core.

5. A digital linear actuator comprising
   an externally threaded shaft;
   a frame supporting the shaft for linear motion, the frame comprising a base and two parallel arms extending from opposite sides of the base, the shaft being supported by the arms;
   means preventing the shaft from rotating;
   an internally threaded generally cylindrical rotor threaded on the shaft and positioned between and closely spaced from the arms of the frame, the outer surface of the rotor being formed of adjacent equally sized teeth running parallel to the shaft;
   an electromagnet comprising a polar wound coil and a generally rod-shaped core through the coil, the electromagnet being mounted on the base of the frame with the core transverse to the shaft;
   first and second fingers at opposite ends of the core, each finger having a first end pivoted at the base of the frame and extending past an end of the core to a free end near the rotor;
   means limiting pivotal movement of each finger to movement between a first position spaced from the core and a second position adjacent to the core;
   first and second reeds attached respectively at the free ends of the first and second fingers and extending toward the rotor, the reeds being so constructed and arranged that when the first finger moves from the first to the second position the end of the first reed engages a tooth in the rotor surface and causes the rotor to turn through a predetermined arc in a first direction to thereby cause an increment of forward linear motion of the shaft, and when the second finger moves from the first to the second position the end of the second reed engages a tooth in the rotor surface and causes the rotor to turn in the direction opposite the first direction to thereby cause an increment of reverse linear motion of the shaft;
   first and second permanent magnets mounted respectively on the first and second fingers, each magnet having a north pole and a south pole defining a polar axis, the magnets being so positioned and oriented that when a finger is in its second position the polar axis of the magnet mounted thereon is aligned with the axis of the core, the polarity of both magnets being the same with respect to the core, whereby application of direct current in one direction through the electromagnet coil causes magnetic attraction of the first finger from the first position to the second position and repulsion of the second finger and application of direct current in the opposite direction through the coil causes magnetic attraction of the second finger from the first position to the second position and repulsion of the first finger; and means for returning each finger to its first position when the electromagnet is not energized.

* * * * *